US009021364B2

(12) United States Patent
Nealer et al.

(10) Patent No.: US 9,021,364 B2
(45) Date of Patent: Apr. 28, 2015

(54) ACCESSING WEB CONTENT BASED ON MOBILE CONTEXTUAL DATA

(75) Inventors: Bryan W. Nealer, Seattle, WA (US);
Megan L Tedesco, Sammamish, WA (US); Jeremiah T Whitaker, Shoreline, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 13/149,756

(22) Filed: May 31, 2011

(65) Prior Publication Data
US 2012/0311465 A1 Dec. 6, 2012

(51) Int. Cl.
G06F 3/00 (2006.01)
H04L 29/06 (2006.01)

(52) U.S. Cl.
CPC ...................................... *H04L 29/06* (2013.01)

(58) Field of Classification Search
CPC .................. G06F 17/30861; G06F 17/30867; G06F 17/30873
See application file for complete search history.

(56) References Cited

U.S. PATENT DOCUMENTS

| 7,702,318 | B2 | | 4/2010 | Ramer et al. | |
|---|---|---|---|---|---|
| 7,747,963 | B2 | | 6/2010 | Othmer et al. | |
| 7,752,553 | B2 | | 7/2010 | Pennington et al. | |
| 8,302,030 | B2 | * | 10/2012 | Soroca et al. | 715/810 |
| 8,677,262 | B2 | * | 3/2014 | Baier et al. | 715/772 |
| 8,903,848 | B1 | * | 12/2014 | Bahrami et al. | 707/769 |
| 2003/0073432 | A1 | | 4/2003 | Meade, II | |
| 2005/0278443 | A1 | | 12/2005 | Winner et al. | |
| 2008/0021891 | A1 | * | 1/2008 | Ikeda | 707/3 |
| 2008/0288573 | A1 | * | 11/2008 | Bellotti et al. | 709/201 |
| 2009/0012841 | A1 | * | 1/2009 | Saft et al. | 705/10 |
| 2009/0089166 | A1 | | 4/2009 | Happonen | |
| 2010/0115398 | A1 | * | 5/2010 | Yi | 715/234 |
| 2010/0161720 | A1 | * | 6/2010 | Colligan et al. | 709/203 |
| 2010/0251280 | A1 | * | 9/2010 | Sofos et al. | 725/14 |
| 2011/0161409 | A1 | * | 6/2011 | Nair et al. | 709/203 |

OTHER PUBLICATIONS

Nokia to deliver highly relevent content with Ovi-Store, published Feb. 18, 2009, <<http://www.slashphone.com/mwc2009-nokia-to-deliver-highly-relevant-content-with-ovi- store-184829>>.

* cited by examiner

*Primary Examiner* — Matt Kim
*Assistant Examiner* — Hua Lu
(74) *Attorney, Agent, or Firm* — Bryan Webster; Taylor Peter; Micky Minhas

(57) ABSTRACT

Available web content is filtered based on context data available on a mobile device. Access to the filtered web content is then made available through an infotainment user interface. Context data may be based on a variety of data including, but not limited to, location information, recent communications, scheduled appointments, social network interactions, user-specified favorites, and so on.

20 Claims, 10 Drawing Sheets

Fig. 4

ACCESSING WEB CONTENT BASED ON MOBILE CONTEXTUAL DATA

BACKGROUND

Mobile devices with access to the Internet and the World Wide Web have become increasingly common, providing users with access to ever increasing amounts of data while on the go. Mobile device users frequently find themselves with small blocks of time during which they may want to quickly access information. For example, while in a doctor's office waiting room, a user may choose to launch a web browser to pass the time. However, with the vast amount of data available over the web, it is likely that the user with a limited window of time will spend most of that time looking for something that is of interest to them and waiting for the browser or the web pages to load, and will not be able to quickly access information of interest.

SUMMARY

This document describes accessing web content based on mobile contextual data. Mobile devices and the various applications that may be executed thereon can be sources for a variety of types of contextual information. By using that contextual information to filter the vast amount of web content that is available to a user at any given time, web content that is contextually relevant, and thus likely to be of interest, is presented to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 is a pictorial diagram illustrating launching of a browser application in response to a user-selection of a representation of a contextually relevant web page in an example infotainment user interface.

DETAILED DESCRIPTION

An infotainment access tool provides a user interface through which access to contextually relevant web content is presented. The information and entertainment value of the selected web content is determined to be potentially relevant to a user based on any combination of any number of factors that the mobile device through which the infotainment access tool is accessed is aware. These factors may include, for example, user-specific context data such as a user's social graph, a user's location (past, present, or anticipated future locations), a user's shopping history, a user's web browsing history, a user's specified favorite web sites, email data, calendar data, and so on. The factors for determining context may also include data aggregated based on previous user selection of suggested web content. Furthermore, the factors for determining context may also include current popularity of web content across a broad or specific audience (e.g., world-wide, nationwide, my friends, my community, fellow camera/food/sports/etc. enthusiasts, local, or "hyper-local," e.g., specific to a particular building or event).

The infotainment access tool is separate and distinct from a web browser application, but provides a user with the ability to launch the browser application to load any particular web page of interest from a plurality of displayed options. For example, the infotainment access tool may display a snapshot of contextually relevant web content that is available through one or more web pages. User selection of a particular displayed web content representation results in the browser application being launched and the web page hosting the selected web content being loaded in the browser.

By providing real-time, direct access to contextually relevant web content, the infotainment access tool enables a user with limited time to surf the web, an easy way to quickly identify and access web pages that are most likely to be of interest to the user at the current time, given current circumstances associated with the user.

Example Environment

Figure 1:
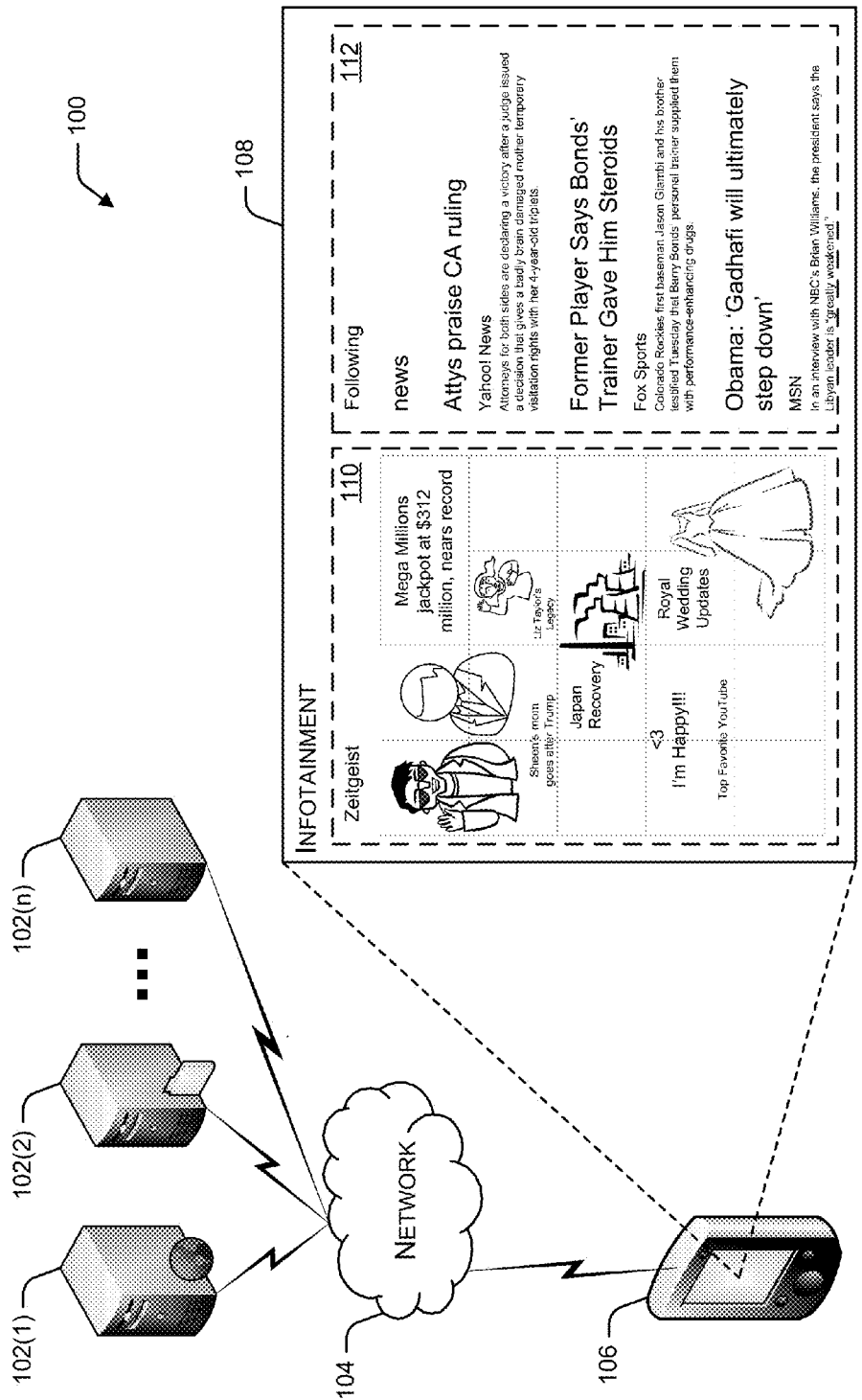
FIG. 1 is a pictorial diagram of an example environment in which an infotainment access tool to provide access to web content based on mobile contextual data may be implemented.

FIG. 1 illustrates an example environment 100 usable to implement an infotainment access tool as described herein. Example environment 100 includes servers 102, network 104, and mobile device 106. Servers 102 may include, for example, web server 102(1), application server 102(2), and any number of other data servers 102(n). Network 104 is representative of any type of communication network including, for example, the Internet. Mobile device 106 is representative of any type of mobile device configured to receive data over network 104. For example, mobile device 106 may be implemented as a mobile phone, a personal digital assistant (PDA), a netbook, a tablet computer, a handheld computer, and so on.

Through the infotainment access tool, mobile device 106 presents an infotainment user interface 108 that displays a snapshot of contextually relevant data that is available, for example, through a browser application. In the illustrated example, user interface 108 includes a "Zeitgeist" section 110, and a "Following" section 112.

Zeitgeist section 110 displays selectable representations of web content dynamically deemed to be contextually relevant based on a variety of real-time data that is available through the mobile device. This may include, for example, contextually relevant news stories, entertainment stories, videos available through sites like YouTube.com, and so on. In the illustrated example, this section includes links to entertainment-related stories about Charlie Sheen and Elizabeth Taylor, a news story about Japan's recovery from a recent earthquake, a news story about the current lottery jackpot, a top YouTube video, and a website devoted to news surrounding an upcoming royal wedding in Great Britain. In an example implementation, as illustrated in FIG. 1, the visual presentation of each story representation may correspond to a relevance confidence level. For example, in the illustrated example, the stories about Charlie Sheen and the royal wedding, each cover four squares of an underlying grid, while the stories about the lottery jackpot, the Japan recovery, and the YouTube video each cover two squares of the underlying grid, and the story about Elizabeth Taylor only covers a single square of the underlying grid. In this implementation, the relative sizes indicate relative confidence that the user will find the stories about Charlie Sheen and the royal wedding more relevant than the story about the lottery, which the user will find more relevant than the story about Elizabeth Taylor. Relative confidence in a story's relevance may be visually represented in any number of ways, including, but not limited to, the size of the representations, the shape of the representations, the color of the representations, the display location of the representations, and/or the transparency of the representations. The user can also provide input back to the system about relevance. For example, the user could stretch the tile with the Elizabeth Taylor story from one square to four squares to demonstrate that the user is very interested in this particular story.

"Following" section 112 displays selectable representations of other web content that is currently being followed by the user and/or one or more social network contacts associated with the user. The order of the web content representations in the "Following" section 112 may be based on contextual relevance such that, for example, stories that the user is following directly are displayed at the top of the list, followed by other stories that are being followed by social networking contacts. In an example implementation, the more contextually relevant a story is determined to be, the further up the list it is displayed. For example, a story that is being followed by many social networking contacts would be nearer the top of the list than a story being followed by only a few social networking contacts. Furthermore, stories that are being followed by social networking contacts with whom the user has had frequent or recent direct contact (e.g., phone calls, instant messages, or emails) may be displayed nearer the top of the list than stories being followed by social networking contacts with whom the user has had less recent direct contact.

Infotainment user interface 108 is illustrated and described herein as a single example of a user interface for enabling access to web content based on mobile contextual data. However, other user interface designs may also be implemented to provide access to such data. For example, the illustrated user interface 108 includes a "Zeitgeist" section and a "Following" section. These specific sections and naming conventions are merely examples. Other user interface implementations may not be divided in sections, may have additional sections such as "Popular with your Friends", may have sections with other naming conventions, and so on.

Example User Interface Navigation

Figure 2:
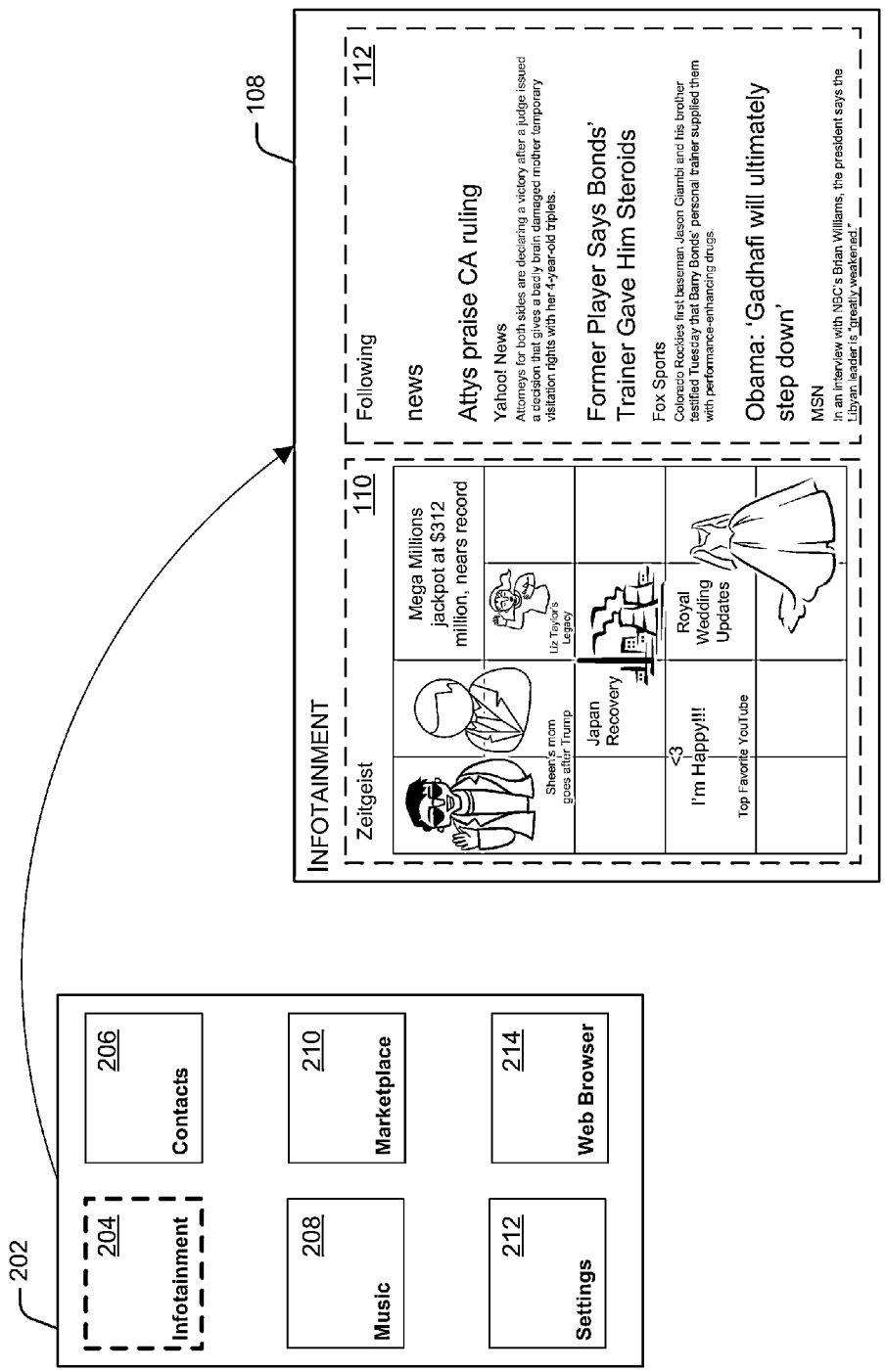
FIG. 2 is a pictorial diagram of an example infotainment user interface.

FIG. 2 illustrates an example transition from a first user interface 202 to previously described user interface 108. In the illustrated example, user interface 202 includes representations of multiple selectable items that may be available, for example, from a main page provided by the mobile device operating system. In the illustrated example, user interface 202 includes an infotainment access tool 204, access to a list of contacts 206, a music player 208, a marketplace 210 where additional applications can be purchased, access to device settings 212, and a web browser application 214. In the illustrated example, when a user selects the infotainment access tool (e.g., "Infotainment" 204), the user interface transitions to display the infotainment user interface 108.

In an alternate implementation, the infotainment access tool may be launched when a user selects web browser 214. In such an implementation, the user request to launch the web browser may be intercepted, and the infotainment user interface 108 displayed instead of a user interface associated with the web browser. Subsequently, when the user selects a representation of web content from the infotainment user interface 108, the web browser is then displayed.

Figure 3:
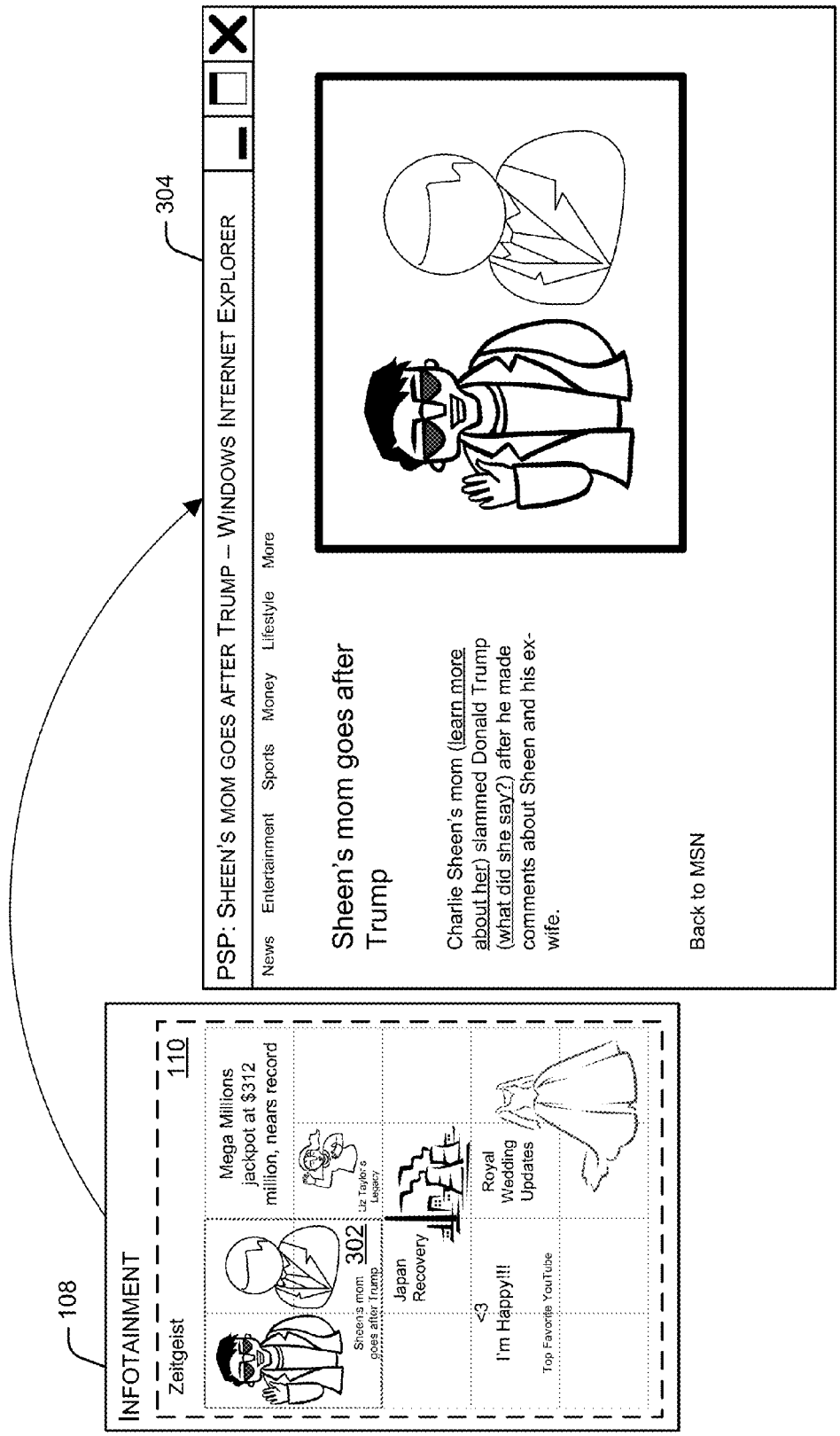
FIG. 3 is a pictorial diagram illustrating launching of a browser application in response to a user-selection of a representation of a contextually relevant web page in an example infotainment user interface.

FIG. 3 illustrates an example transition from infotainment user interface 108 to a browser application based on user selection of a representation of web content in the "Zeitgeist" section of the infotainment user interface. In FIG. 3, the left portion of the infotainment user interface 108 is illustrated, showing the "Zeitgeist" section 110. When the user selects a web content representation (e.g., the story about Charlie Sheen 302), the browser application is launched, and the browser user interface 304 is displayed with the web page providing the selected story loaded in the browser. To facilitate loading the appropriate web page when the browser application is launched, each web content representation in the infotainment user interface 108 has an associated universal resource locator (URL) that is passed to the browser application when the browser application is launched.

Figure 4:
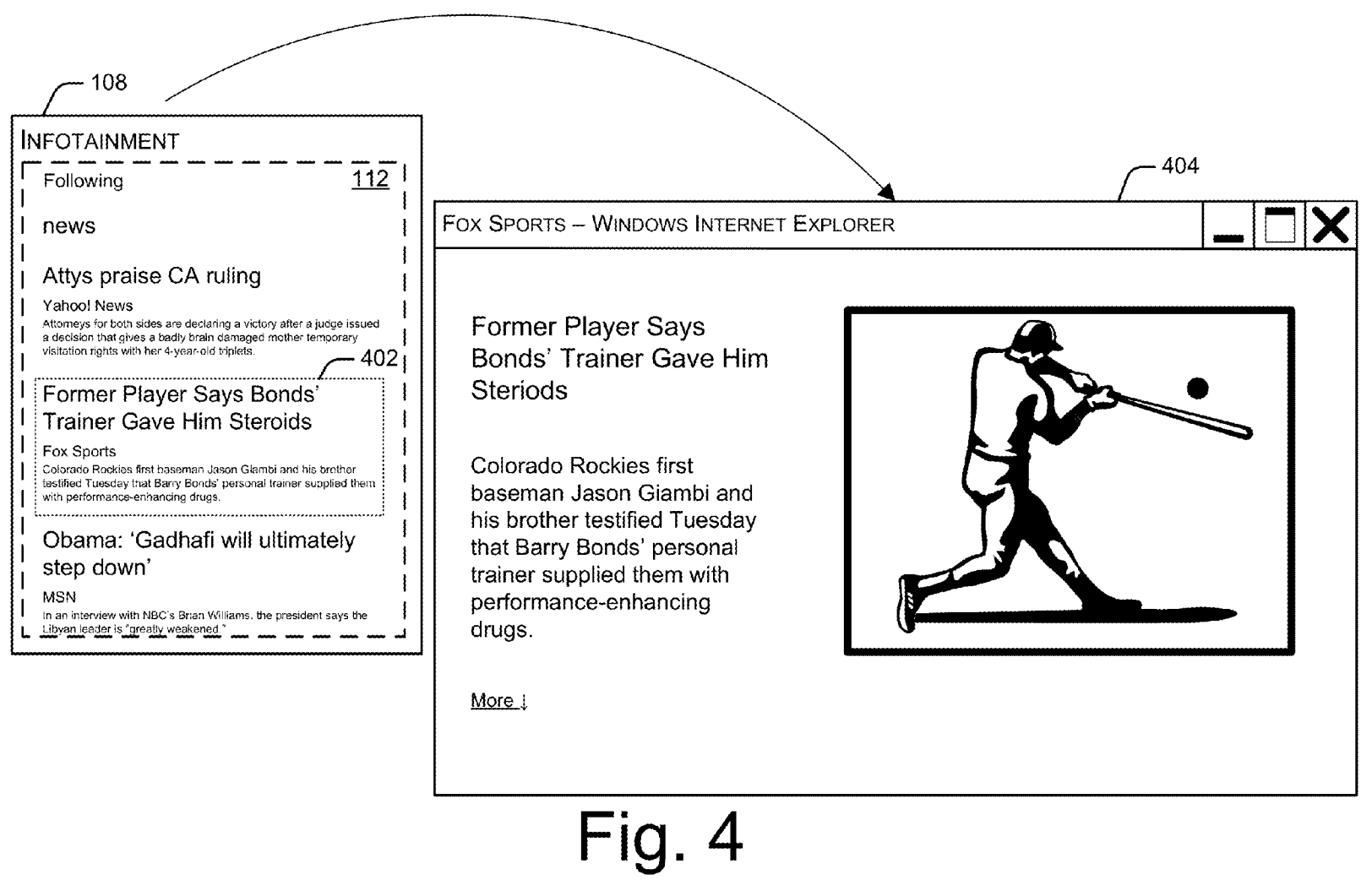

FIG. 4 illustrates an example transition from infotainment user interface 108 to a browser application based on user selection of a representation of web content in the "Following" section of the infotainment user interface. In FIG. 4, the right portion of the infotainment user interface 108 is illustrated, showing the "Following" section 112. When the user selects a web content representation (e.g., the story about steroid use in baseball 402), the browser application is launched, and the browser user interface 404 is displayed with the web page providing the selected story loaded in the browser.

Example Contextual Filter

Figure 5:
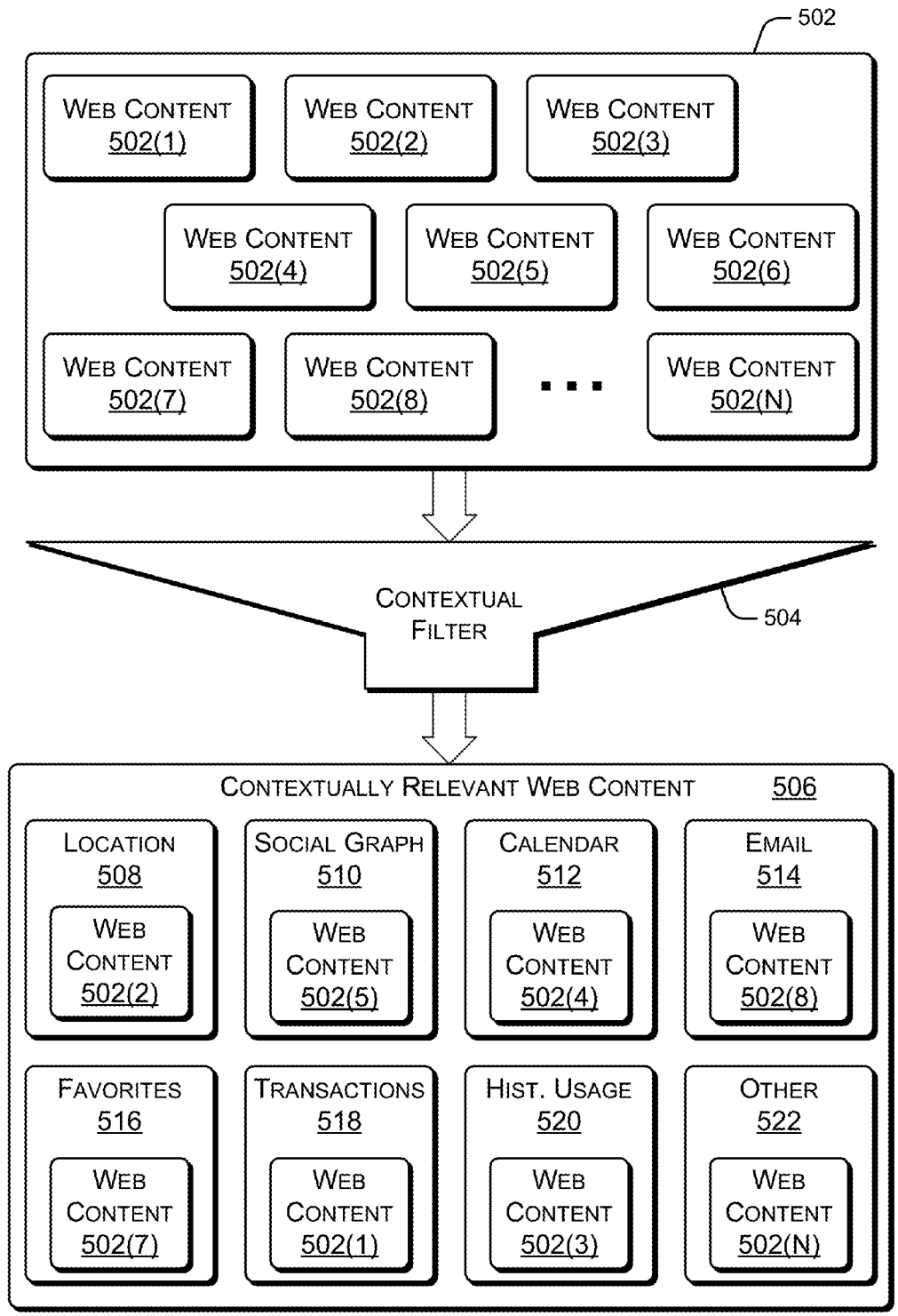
FIG. 5 is a block diagram illustrating an example filtering of available web content based on current contextual information.

FIG. 5 illustrates contextual filtering of available web content in preparation for displaying the infotainment user interface. As illustrated in FIG. 5, at any point in time, a very large amount of web content 502 is available. Individual items of web content (e.g., news stories, YouTube videos, product reviews, blog entries, etc.) are illustrated in FIG. 5 as web content 502(1), 502(2), 502(3), . . . , 502(N). In preparation for displaying the infotainment user interface 108, the large amount of available web content 502 is passed through contextual filter 504, the result of which is contextually relevant web content 506.

For example, contextually relevant web content 506 may include, but is not limited to web content that is relevant based on location 508, web content that is relevant based on a social graph 510, web content that is relevant based on information stored in a calendar 512, web content that is relevant based on information contained in email 514, web content that is relevant based on user-defined favorites 516, web content that is relevant based on transactions 518, web content that is relevant based on historical usage of the filter 520, and web content that is relevant based on any number of other contexts 522.

As illustrated in FIG. 5, for example, web content 502(2) may be deemed contextually relevant based on a location component of contextual filter 504. For example, global positioning system (GPS) data maintained by the mobile device 106 may indicate that the user is currently located at the corner of 7$^{th}$ Ave. and Pike St. in downtown Seattle. Furthermore, a compass module of mobile device 106 may indicate that the user is currently facing northeast. Based on this location information, contextual filter 504 may identify web content 502(2) as relevant because web content 502(2) provides a collection of customer reviews of The Cheesecake Factory located at the northeast corner of 7$^{th}$ Ave. and Pike St.

As another example, web content 502(5) may be deemed contextually relevant based on a social graph component of contextual filter 504. In this example, web content 502(5) may be a news story about a local high school student receiving a sports scholarship to a major college. The web content 502(5) may be deemed contextually relevant based on a user's social graph in a variety of ways. For example, if the local high school student about whom the news story was written is in the user's social graph (e.g., the user of the mobile device has a social networking relationship with the local high school student), the story may be deemed contextually relevant. Similarly, if the user of the mobile device does not have a direct connection to the subject of the story, but several of the user's social contacts do have direct connections to the individual, then the web story may be deemed contextually relevant. Additionally, as another example, if a number of the user's social contacts have been sharing and communicating about the story (e.g., due to an interest in the college mentioned in the story), then the story may also be deemed contextually relevant.

Web content may also be deemed contextually relevant based on calendar data. For example, if a user has entered an appointment in a calendar on mobile device 106 that indicates that the user is participating in a 12K run on May 1$^{st}$, then a news article about the 12K run (e.g., web content 502(4)) may be deemed contextually relevant. As another example, an appointment in a user's calendar may indicate that the user is scheduled to be in Hawaii during an upcoming vacation. Based on this location information gleaned from calendar data, web content related to Hawaii may be deemed contextually relevant.

Similarly, web content may be deemed contextually relevant based on email data. For example, if the user frequently receives email from a particular clothing store, then web content (e.g., web content 502(8)) associated with that clothing store (e.g., an advertisement, a news article, etc.) may be deemed contextually relevant.

Web content may also be deemed contextually relevant based on user-defined favorites. For example, if a user specifies favorite web sites through a web browser interface, recently updated information available through those favorite web sites (e.g., web content 502(7)) may be deemed contextually relevant. In an example implementation, user-defined favorites may also include user-specified keywords of phrases that are maintained (as opposed to being entered, for example, through a search engine). For example, a user may specify a keyword like "running," and then websites and content related to that keyword may be deemed contextually relevant based on the user-specified keyword.

Web content may also be deemed contextually relevant based on transaction data. For example, mobile devices are increasingly being used to support financial transactions through mobile coupon codes, barcodes stored on a mobile device to identify products, banking information to enable the use of the mobile device as a debit or credit card, and so on. In an example implementation, such transactions may be logged and this information may be used as a context to identify relevant web content. For example, if the transaction history shows that the user makes a purchase at a particular coffee shop most every day, web content related to that particular coffee shop or web content related to products sold at that particular coffee shop (e.g., web content 502(1)) may be deemed contextually relevant.

Web content may also be deemed contextually relevant based on historical usage of the infotainment access tool. In an example implementation, historical usage data may be used in combination with other contexts. For example, a user may frequently select web content that is deemed contextually relevant based on social graph data. The historical usage data may indicate that the user usually selects web content that has been shared by a few specific individuals within the social graph. This information can be used to filter web content to specifically include more web content (e.g., web content 502(3)) that is shared by those few specific individuals.

As illustrated in FIG. 5, any number of other contexts 522 that are available through mobile device 106 may also be used to filter available web content 502 to identify contextually relevant web content 506. Furthermore, the available contextual information may also be combined to further identify the contextually relevant web content 506. For example, information associated with a user's social graph may indicate that several of the users' contacts are planning to attend a particular concert in Las Vegas on May 15. Furthermore, the user's calendar data may indicate that the user has a business meeting scheduled in Las Vegas on May 14. Due to the similarity in location and date, an advertisement for the concert may be deemed contextually relevant.

Example Mobile Device

Figure 6:
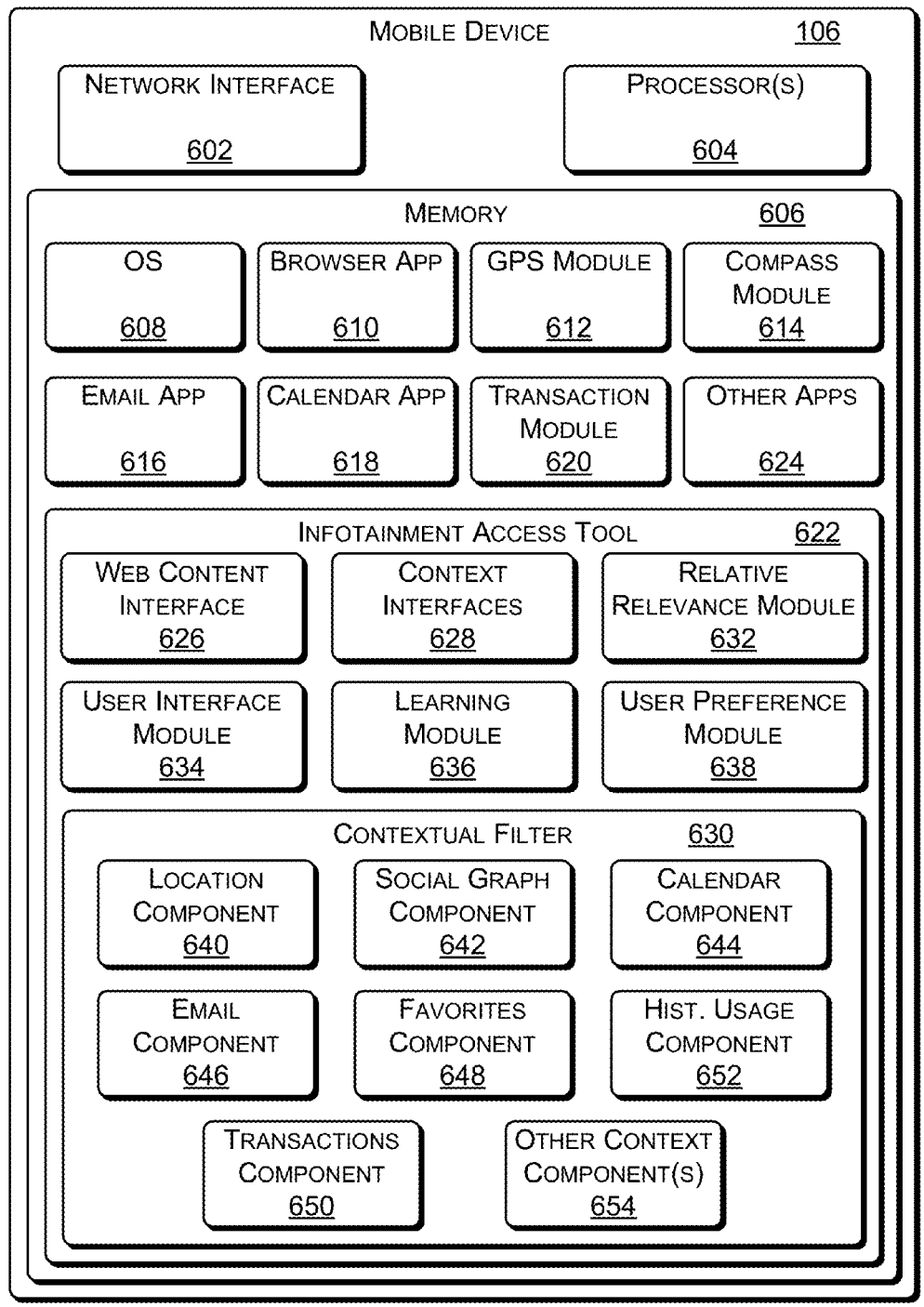
FIG. 6 is a block diagram that illustrates select components of an example mobile device configured to provide user access to web content based on current contextual information.

FIG. 6 illustrates select components of an example mobile device 106 configured to provide access to web content based on mobile contextual data as described herein. Example mobile device 106 includes a network interface 602, one or more processors 604, and a memory 606. Network interface 602 enables mobile device 106 to send and/or receive data over a network 104. Network interface 602 may also represent any combination of other communication interfaces to enable mobile device 106 to send and/or receive various types of communication, including, but not limited to, web-based data and cellular telephone network-based data.

An operating system 608, a browser application 610, a global positioning system (GPS) module 612, a compass module 614, an email application 616, a calendar application 618, a transaction module 620, an infotainment access tool 622, and any number of other applications 624 are stored in memory 606 as computer-readable instructions, and are executed, at least in part, on processor 604.

Browser application 610 represents any of a variety of applications that can be executed on mobile device 106 to provide a user interface through which web content available over the Internet may be accessed. Furthermore, browser application 610 may be configured to maintain a repository of universal resource locators (URLs) associated with user-defined favorite web pages.

GPS module 612 represents any functionality implemented on mobile device 106 to determine, monitor, and/or track geographic positions of the mobile device 106 according to a global positioning system. As an example, GPS module 612 may be used, at least in part, to provide maps and/or navigation directions to users of mobile device 106. As described herein, GPS module 612 may be configured to identify a current location of mobile device 106 at any given time and/or to maintain a history of locations at which mobile device 106 has previously been located.

Compass module 614 represents any functionality implemented on mobile device 106 to determine a current geographic direction of the mobile device. In an example implementation, information gleaned from compass module 614 may be combined, for example, with information gleaned from GPS module 612 to provide additional location information.

Email application 616 provides user access to one or more email accounts through mobile device 106. Email application 616 may maintain a repository of sent and/or received email messages, as well as a repository of contact information associated with other entities with which a user of mobile device 106 may communicate via email.

Calendar application 618 provides an interface through which a user of mobile device 106 may create, view, and modify appointments that are date/time specific. Calendar application 618 also maintains a repository of such appointments, including, for each appointment, information that may include, but is not limited to, any combination of date, time, attendees, location, and appointment description.

Transaction module 620 represents any functionality implemented on mobile device 106 to support transactions. For example, transaction module 620 may include functionality that enables the mobile device 106 to be used as a credit or debit card, functionality that enables the mobile device 106 to serve as a coupon repository, and so on. In an example implementation, when mobile device 106 is used during a transaction, a record of the transaction is created and maintained.

Other applications 624 may include any number of other applications that are executable on the mobile device 106. Such other applications may include, for example, a music player, a camera, a calculator, one or more games, one or more productivity tools, an instant messaging application, an accelerometer, and so on.

Infotainment access tool 622 includes web content interface 626, one or more context interfaces 628, contextual filter 630, relative relevance module 632, user interface module 634, learning module 636, and user preference module 638.

Web content interface 626 identifies available web content. For example, web content interface 626 may interface with browser application 610 to become aware of web content that is currently available. Alternatively, web content interface 626 may be configured to directly access the Internet, bypassing browser application 610. Web content interface 626 may also access really simple syndication (RSS) feeds and other similar data sources to become aware of currently available web content.

Any combination of various web content sources may be accessed to identify available web content. In an example implementation, a web search service may be used to identify web content that is currently popular across a fairly wide audience based on "top stories" or "top searches," which are typically maintained by Internet search services. Furthermore, web content may be identified through RSS feed subscriptions that are associated with the user, "top recommended" content from sites that the user is known to frequent, and so on. Other context information may also be used to identify the web content sources. For example, if the user has a subscription to a New York Times daily news email, then a New York Times website may be among the selected sources for identifying available web content. Any combination of techniques may be used to identify web content sources, and any combination of web content sources may be used for identifying available web content.

Context interfaces 628 provide infotainment access tool 622 access to contextual information available on mobile device 106. For example, context interfaces 628 may include a component to access the list of URLs associated with user-specified favorite web sites as maintained by browser application 610. Context interfaces 628 may also include a component to interface with GPS module 612 to obtain current and/or historical location information. Context interfaces 628 may also include a component to interface with email application 616 to determine, for example, entities from which a user of mobile device 106 has received emails, entities to which a user of mobile device 106 has sent emails, subjects of sent and/or received emails, and any other information specific to email data. Context interfaces 628 may also include a component to interface with calendar application 618 to access any appointment-specific information maintained by calendar application 618. As described above, appointment-specific information may include, for example, dates, times, attendees, locations, and appointment descriptions. Finally, context interfaces 628 may also include one or more additional interfaces for accessing contextual information from any number of other applications 624, which may serve as contextual data sources.

Contextual filter 630 filters the available web content through the context interfaces 628 to identify web content that is most likely to be of interest to the user based on current context information. Example contextual filter 630 includes location component 640, social graph component 642, calendar component 644, email component 646, favorites component 648, transactions component 650, historical usage component 652, and one or more other context components 654.

Location component 640 applies location-based context information to filter available web content to identify available web content that may be contextually relevant based on any combination of past, current, or anticipated future locations. For example, based on contextual information obtained from GPS module 612, a current location and/or any number of past locations may be determined Currently available web content that is in any way related to the current and/or recent past locations may then be identified as contextually relevant.

Social graph component 642 applies social networking-based context information to filter available web content to identify available web content that may be contextually relevant to the user based on recent social networking interactions. For example, web content that has been recently shared by one or more social networking contacts associated with a user of mobile device 106 may be deemed contextually relevant.

Calendar component 644 applies calendar-based context information to filter available web content to identify available web content that may be contextually relevant to the user based on information gleaned from calendar application 618. For example, if the user has an upcoming vacation to Hawaii scheduled in their calendar, a web story related to a pineapple plantation may be deemed contextually relevant.

Email component 646 applies email-based context information to filter available web content to identify available web content that may be contextually relevant to the user based on information gleaned from email application 616. For example, if the user has recently been sending and receiving multiple email messages with subjects that include the word "birthday," a local news article about a new party supply store may be deemed contextually relevant.

Favorites component 648 applies user-specified favorites information to filter available web content to identify available web content that may be contextually relevant. For example, if the user has specified an online poker website as a favorite URL, then a recent web story about a federal shutdown of online gambling sites may be deemed contextually relevant.

Transactions component 650 applies transaction-based context information to filter available web content to identify available web content that may be contextually relevant. For example, if the user has made frequent or recent purchases of a particular product, web content associated with that particular product may be deemed contextually relevant.

Historical usage component 652 applies information gathered from previous user interaction with infotainment access tool 622 to filter available web content. For example, usage information that indicates that a user frequently selects web content that has been obtained through a particular source or in association with a particular type of context filter may be used to filter currently available content.

Other context components 654 apply other contextual information to filter available web content to identify available web content that may be contextually relevant. For example, other context information that may be used may include, but is not limited to, recent searches, instant messaging information, data that identifies recently accessed applications (e.g., games, productivity apps, etc.), accelerometer data that can be used to determine a speed with which the mobile device is moving, and so on.

Relative relevance module 632 determines relative relevance of the various available web stories that pass through contextual filter 630. In an example implementation, relative relevance module 632 may assign a relevance score to each web story that is identified as being contextually relevant. In such an implementation, a higher score may indicate that a particular story has been identified as highly relevant based on current context, while a lower score may indicate that a particular story has been identified as less relevant based on current context. For example, if a user is currently standing outside of a baseball stadium where a baseball game is being played, a web story that gives the current score of the game may be determined to be highly relevant, while a web story about the city mayor's run for re-election may be determined to be less relevant.

Any number of techniques may be used to determine and to indicate relative relevance of web content. For example, for web content that is determined to be contextually relevant based on location, the more specifically a particular web story is related to a current location of the mobile device, the more relevant the web story is likely to be ranked. Similarly, for web content that is determined to be contextually relevant based on social networking chatter about the web content, a story that has a lot of recent associated social networking chatter is likely to be deemed more relevant than a story with less recent social networking chatter.

User interface module 634 correlates the data that is received through context interfaces 628, filtered through contextual filter 630, and processed by relative relevance module 632 to render the infotainment user interface. User interface module 634 dynamically determines the size and position of each data representation to be displayed through the infotainment user interface. As described above, the size and position of each data representation may be based on relative relevance of the web content, as determined by relative relevance module 632. In the illustrated example, user interface module 634 may also determine, based on information from contextual filter 630, which web content representations to display in a "Zeitgeist" section, and which to display in a "Following" section. The user interface module may also provide a feedback mechanism for the user to indicate relevance. For example, user interface module 634 may enable a user to adjust the size or position of one or more tiles that represent particular stories, wherein the adjusted size or position is interpreted to represent the user's interest in the particular story. Alternatively or additionally, user interface module 624 may enable a user to "like," "dislike," or otherwise flag a particular content as being of interest or as not being of interest.

Learning module 636 tracks implicit and/or explicit user feedback regarding web content that has been identified as contextually relevant, and uses the feedback to improve future results from contextual filter 630. For example if web content that is identified as being contextually relevant based on favorites component 648 is rarely selected by the user (i.e. implicit feedback), then contextual filter may, in the future, rely less on favorites component 648 when filtering available web content. Similarly, if web content that is identified as being contextually relevant based on location component 640 is frequently selected by the user (i.e., implicit feedback), then contextual filter 630 may, in the future, rely more heavily on location-specific context information when filtering available web content. An example of explicit feedback that may be used by learning module 636 occurs when a user specifically "likes," "dislikes," or otherwise flags (e.g., through a selectable menu option) a particular web content. Furthermore, if a user adjusts the size and or position of displayed representations of web content (i.e., explicit feedback), those size and position adjustments may also be interpreted by learning module 636 to reflect user interest in the represented web content. For example, if the user increases the size of a particular displayed tile or drags a particular tile to a more prominent location within the display, this may be interpreted as increased user interest in the story. Similarly, if the user decreases the size of a particular displayed tile or drags a particular tile to a less prominent location within the display, this may be interpreted as decreased user interest in the story. This information may then be utilized by learning module 636 to adjust future applications of the various filter components.

As discussed above, a similar function may be performed by historical usage component 652. In various implementations, infotainment access tool 622 may include learning module 636 and historical usage component 652. In alternate implementations, infotainment access tool 622 may include one or the other, or neither.

User preference module 638 is implemented to allow a user to specify what types of contextual information are to be made available to infotainment access tool. For example, a user may not wish to have their current location information used to filter available web content. In such a scenario, the user could, through user preference module 638, opt-out of having GPS-based location information made available from GPS module 612 to infotainment access tool 622. Similarly, a user may opt-in or opt-out of any of the specific context interfaces 628 and/or any of the context components of contextual filter 630. This allows the user to specify what types of potentially personal information is accessed from various components of the mobile device to support the contextual filtering of available web content.

Although illustrated in FIG. 6 as being stored in memory 606 of mobile device 106, infotainment access tool 622, or portions thereof, may be implemented using any form of computer-readable media that is accessible by mobile device 106. Furthermore, in alternate implementations, one or more components of operating system 608, browser application 610, GPS module 612, email application 616, calendar application 618, infotainment access tool 622, and/or other applications 624 may be implemented as part of an integrated circuit that is part of, or accessible to, mobile device 106. Furthermore, although illustrated and described as being implemented on a mobile device 106, the data access and other functionality provided by infotainment access tool 622 as described herein may also be implemented on any other type of computing device that is aware of contextual information and through which a user can access data, including, but not limited to, desktop computer systems and laptop computer systems.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Example Operation

FIGS. 7-10 illustrate an example process 700 for implementing an infotainment access tool to provide access to web content based on mobile context data, as described herein. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the processes without departing from the spirit and scope of the subject matter described herein. Furthermore, while this process is described with reference to the mobile device 106 described above with reference to FIG. 1 and FIG. 6, other computer architectures may implement one or more portions of this process, in whole or in part.

Figure 7:
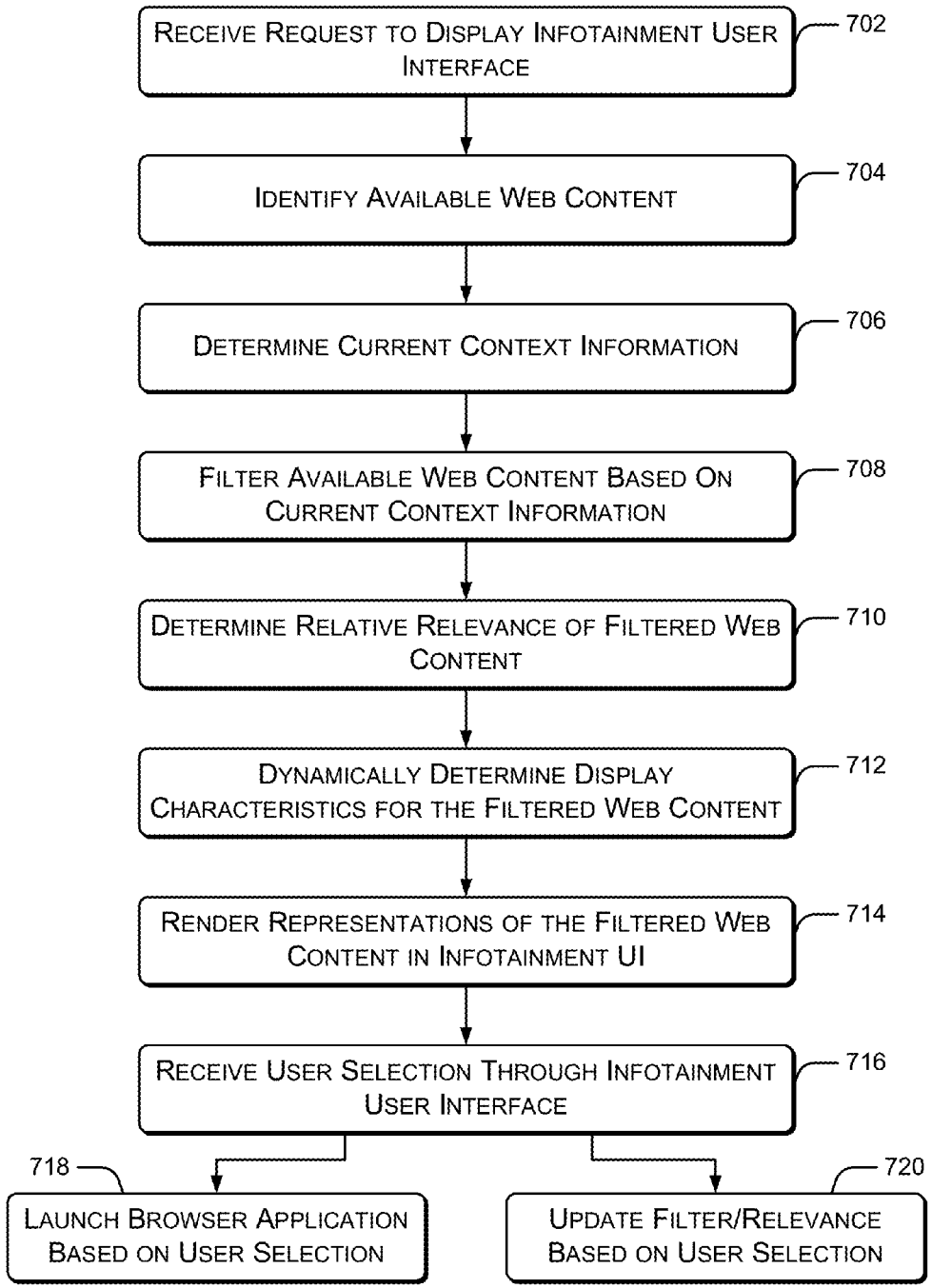
FIG. 7 is a flow diagram of an example process for implementing an infotainment access tool on a mobile device.

FIG. 7 illustrates an example process 700 for implementing an infotainment access tool.

At block 702, a request to display an infotainment user interface is received. For example, as illustrated in FIG. 2, a user may select an infotainment application from a main page provided by a mobile device operating system. Alternatively, as described above with reference to FIG. 2, the infotainment user interface may be launched in response to a user-selection of a browser application (e.g., web browser 214) from a main page provided by a mobile device operating system.

At block 704, available web content is identified. For example, web content interface accesses one or more pre-defined data sources to identify currently available web content. As described above with reference to FIG. 6, any combination of various web content sources may be accessed to identify available web content. In an example implementation, a web search service may be used to identify web content that is currently popular across a fairly wide audience based on "top stories" or "top searches," which are typically maintained by Internet search services. Furthermore, web content may be identified through RSS feed subscriptions that are associated with the user, "top recommended" content from sites that the user is known to frequent, and so on. Other context information may also be used to identify the web content sources. For example, if the user has a subscription to a New York Times daily news email, then a New York Times website may be among the selected sources for identifying available web content. Any combination of techniques may be used to identify web content sources, and any combination of web content sources may be used for identifying available web content.

At block 706, current context information is determined. For example, context interfaces 628 access a variety of contextual information that is available through resources on the mobile device 106. For example, context interfaces 628 may access a list of user-specified favorite web sites from browser app 610, location information (current and/or historical) from GPS module 612, email information from email app 616, calendar information (which may include additional location information) from calendar app 618, and any other available context information from, for example, other apps 624. As described above, the specific types of context information that is accessed may also be determined based on user preferences specified through user preference module 638. An additional example process for determining current context information is described in further detail below with reference to FIG. 8.

At block 708, the identified available web content is filtered based on the current context information. For example, contextual filter 630 is applied to the available web content in light of the contextual information obtained by context interfaces 628, to identify web content that is contextually relevant. An additional example process for filtering available web content based on current context information is described in further detail below with reference to FIG. 9.

At block 710, relative relevance of the filtered web content is determined. For example, relative relevance module 632 may assign a score or rank to the various individual web stories that are part of the filtered web content. The rank or score is assigned to reflect relative relevance, such that, for example, a web story that is determined to be highly relevant is given a rank or score that is greater than a rank or score given to a web story that is determined to be less relevant.

In an example implementation, relative relevance is determined based on a degree to which the various types of contextual information obtained by context interfaces 628 applies to each particular web story. Alternatively or additionally, information gathered from learning module 636 and/or information available through historical usage component 652 may also be considered in determining the relative relevance of the filtered web content. An additional example process for determining relative relevance of the filtered web content is described in further detail below with reference to FIG. 10.

At block 712, display characteristics for the filtered web content are dynamically determined. For example, user interface module 634 determines where representations of each web story will appear, as well as relative sizes and positions of the representations to be displayed. In an example implementation, sizes, positions, and other display characteristics are determined based, at least in part, on the determined relative relevance. In an alternate example implementation, display characteristics are determined based, at least in part, on historical usage data.

At block 714, representations of the filtered web content are rendered for display. For example, user interface module 634 generates a user interface display 108 that includes representations of the web content that has been determined to be contextually relevant.

At block 716, a user selection is received through the infotainment user interface. For example, as illustrated in FIGS. 3 and 4, a user may select a displayed representation of contextually relevant available web content.

At block 718, in response to receiving the user selection through the infotainment user interface, a browser application is launched. For example, as illustrated in FIGS. 3 and 4, the browser application is launched and the web page associated with the selected web content representation is loaded.

At block 720, also in response to receiving the user selection through the infotainment user interface, contextual filter 630 and/or relative relevance module 632 may be updated. For example, learning module 636 records information associated with the user selection. In an example implementation, this information may include a URL associated with the selected web content, an indication of context information that resulted in the web content being identified as contextually relevant, and/or an indication of a relevance score or rank associated with the web content. In an alternate example, rather than selecting a particular content for viewing, "user selection" as represented by block 716 may include user-specified to changes to display characteristics through the user interface. For example, a user may resize or reposition one or more web content representations through the user interface, indicating relative user preference. Based on this information, possibly in aggregate with other such information recorded from other user selections, contextual filter 630 and/or relative relevance module 632 may be updated.

For example, contextual filter 630 may be updated to place more importance on filter components associated with the type of context information that resulted in the user-selected web content being deemed contextually relevant. Furthermore, historical usage component 652 of contextual filter 630 may be updated to reflect recent user selections. Similarly, relative relevance module 632 may be updated to rank similarly selected web content higher in future operations.

Figure 8:
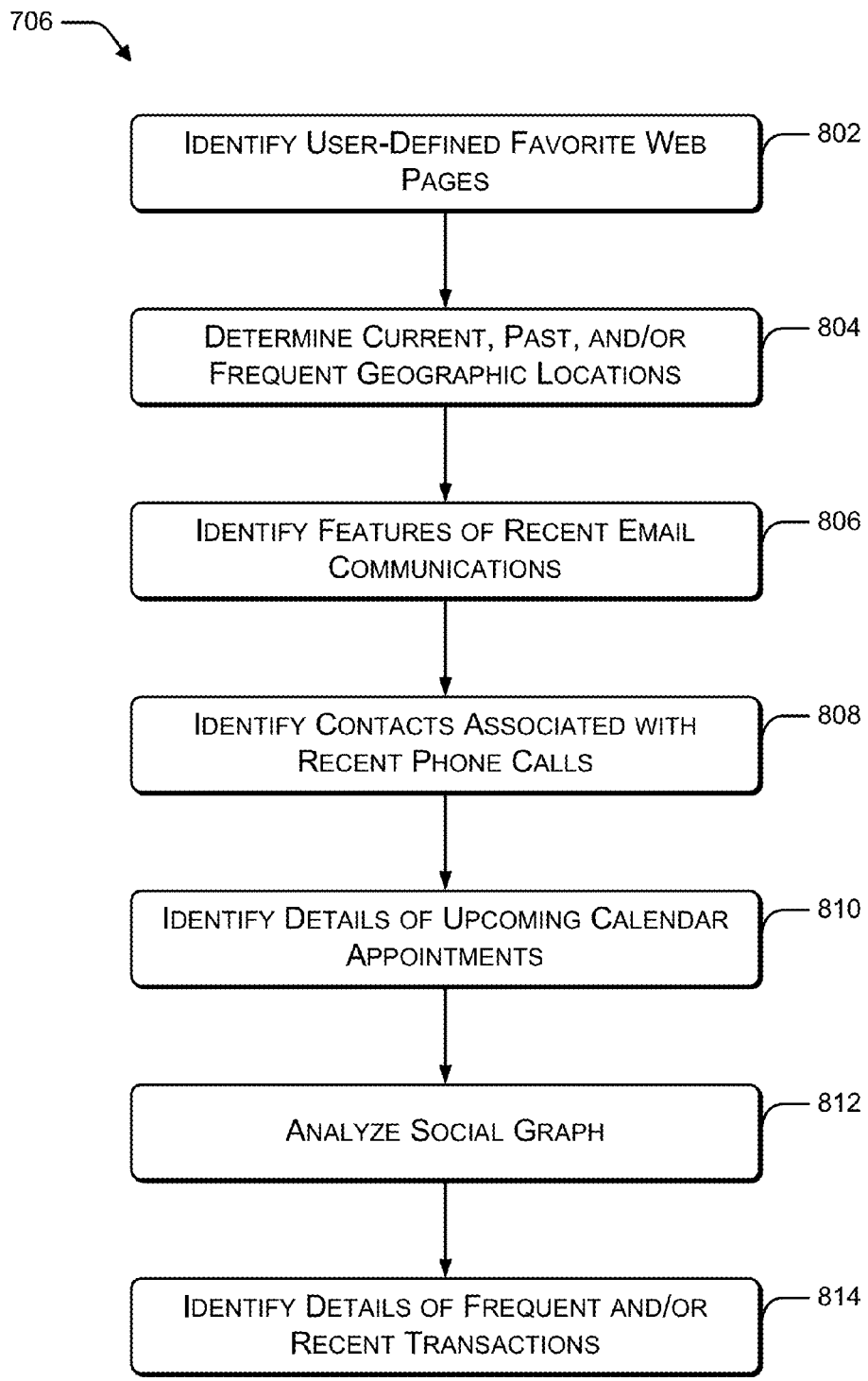
FIG. 8 is a flow diagram that illustrates an example process for determining current context information.

FIG. 8 illustrates an example process 706 for determining current context information.

At block 802, user-defined favorite web pages are identified. For example, context interface 628 may obtain from browser application 610, user-specified favorite information. Additionally, or alternatively, context interface 628 may obtain browser history data to identify frequently or recently visited websites.

At block 804, current, past, and or frequent geographic locations are determined. For example, context interface 628 extracts information from GPS module 612 to determine a current location of mobile device 106, and possibly also past and/or frequently visited locations.

At block 806, features of recent email communications are identified. For example, context interface 628 communicates with email application 616 to identify any of a variety of information associated with recent email communications. This information may include, for example, frequently used words in email subjects and sender or recipient contact information.

At block 808, contacts associated with recent phone calls are identified. For example context interface 628 interfaces with a phone module of client device 106 (represented in FIG. 6 as part of other apps 624), to identify contact information identifying individuals with whom phone calls have recently occurred through mobile device 106. In an example implementation, the phone call information may be correlated with a user's social graph to identify individuals with whom a user of the mobile device has a social networking relationship and with whom the user has had a recent phone call.

At block 810, details of upcoming calendar appointments are identified. For example, context interface 628 interfaces with calendar application 618 to extract any number of appointment details from upcoming calendar items. For example, for any given appointment, any combination of, a subject of the appointment, individuals invited to the appointment, a date and/or time of the appointment, and/or a location of the appointment may be identified.

At block 812, a social graph associated with a user of the mobile device is analyzed. For example, context interface 628 may access one or more social networks (e.g., through the Internet, or through a social networking application) to identify information associated with a user's social networking behavior. For example, context interface 628 may identify web content that has been recently shared by others in a user's social network, individuals with whom the user has recently had direct interaction through the social network, locations of others in the user's social network (e.g., as identified through a Facebook "checkin"), and so on.

At block 814, details of frequent and/or recent transactions are identified. For example, context interface 628 may access transaction logs from transaction module 620. As described above with reference to FIG. 6, transaction module 620 maintains records of transactions that may indicate, for example, products purchased, coupons used, stores frequented, and so on.

FIG. 8 illustrates a process that includes identification of various types of context information. As discussed above, any of the illustrated blocks may be optional, and any number of the illustrated blocks may be combined in an implementation of an infotainment access tool as described herein. Furthermore, as described above with reference to FIG. 6, the identification of current context information is not limited to the examples represented in FIG. 8. Rather, any information that is available through data sources on the mobile device may be used to determine a current context, which may then be used to filter available web content.

Figure 9:
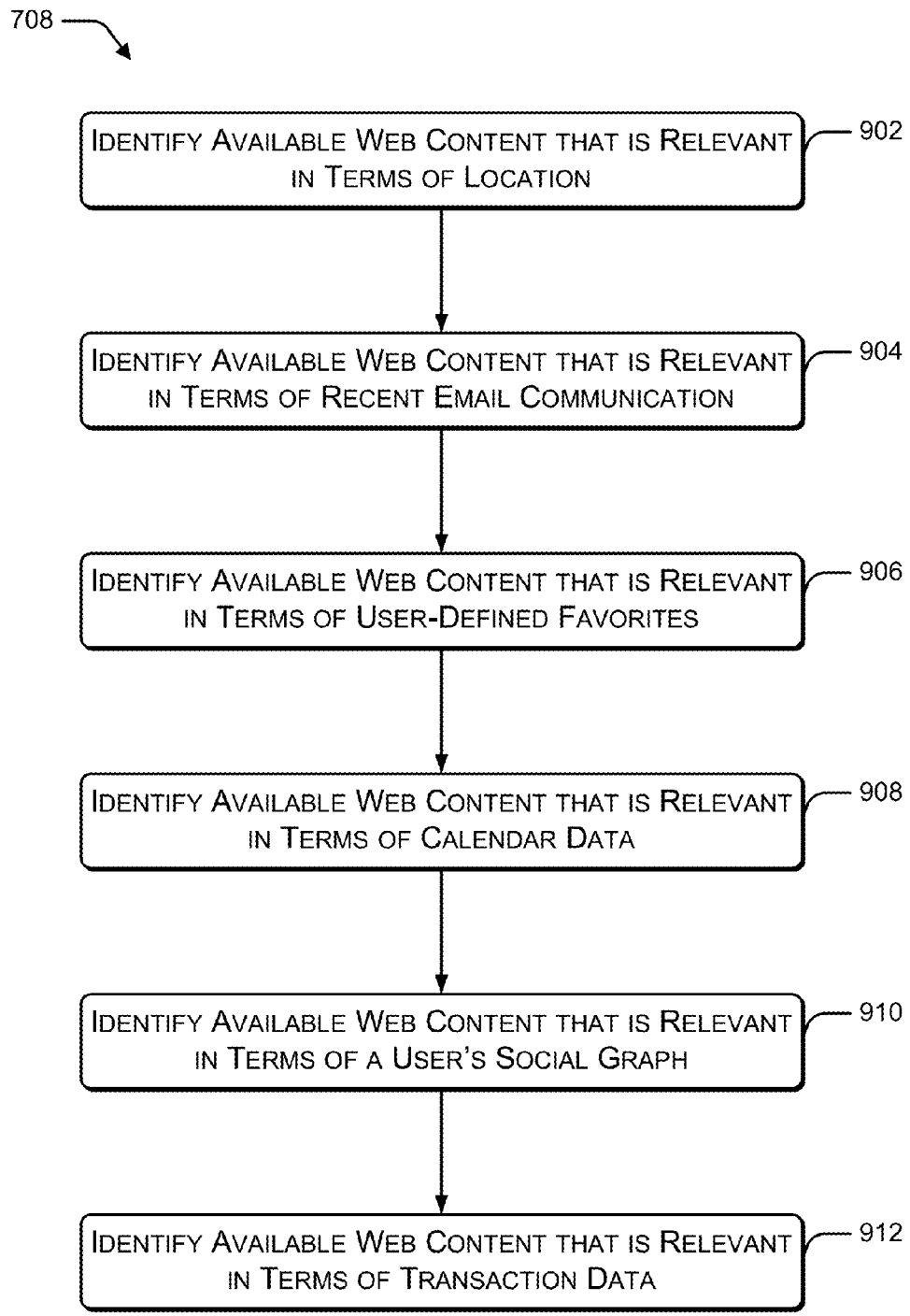
FIG. 9 is a flow diagram that illustrates an example process for filtering available web content based on current context information.

FIG. 9 illustrates an example process 708 for filtering available web content based on current context information.

At block 902, web content that is relevant in terms of location is identified. For example, location component 640 filters available web content based on location information received, for example, from GPS module 612.

At block 904, web content that is relevant in terms of recent email communication is identified. For example, email component 646 filters available web content based on subjects identified in recent emails or based on individuals with whom emails have been recently exchanged.

At block 906, web content that is relevant in terms of user-defined favorites is identified. For example, favorites component 648 filters available web content based on user-defined favorite web sites, identifying, for example, favorite sites with recently updated information.

At block 908, web content that is relevant in terms of calendar data is identified. For example, calendar component 644 filters available web content based on data received through calendar application 618. Web content may be identified as contextually relevant based, for example, on individuals attending scheduled appointments, locations of scheduled appointments, or date/time information associated with scheduled appointments.

At block 910, web content that is relevant in terms of a user's social graph is identified. For example social graph component 642 filters available web content based on social network contacts, recent web content shared by individuals in a user's social graph, current locations of individuals in a user's social graph, and so on.

At block 912, web content that is relevant in terms of transaction data is identified. For example transactions component 650 filters available web content based on transaction logs that may identify purchased products, stores from which products have been purchased, coupons used, coupons stored, and so on. Based on this data, for example, web content that is related to frequently or recently purchased products may be identified as contextually relevant.

Figure 10:
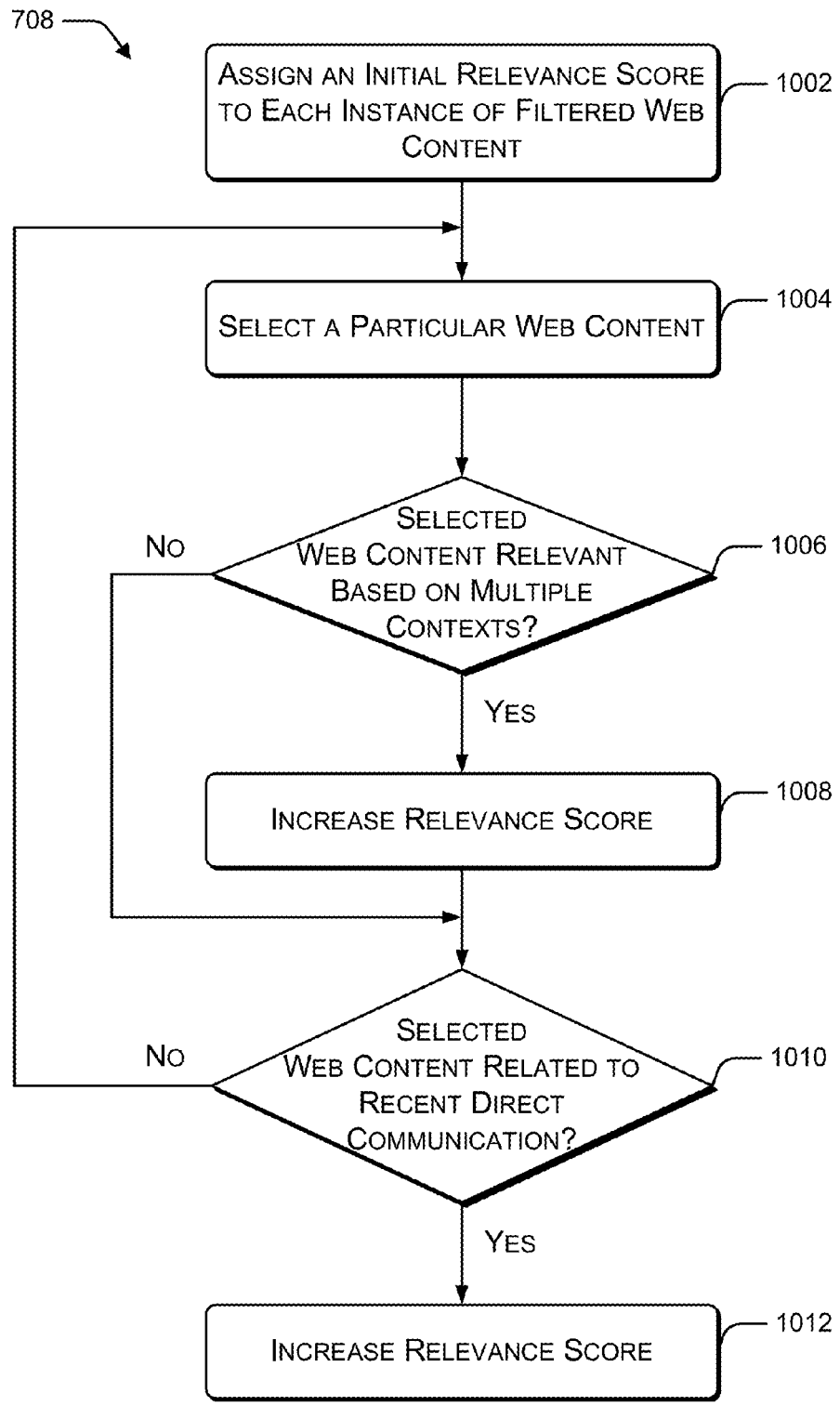
FIG. 10 is a flow diagram that illustrates an example process for determining relative relevance of filtered web content.

FIG. 10 illustrates an example process 710 for determining relative relevance of filtered web content.

At block 1002, initial relevance scores are assigned to each instance of the filtered web content. For example, relative relevance module 632 initializes representations of the filtered web content with metadata that identifies an initial relevance score. In an example implementation, each instance of filtered web content is given the same initial relevance score. In an alternate implementation, each instance of filtered web content is given an initial relevance score based on the type of context information that resulted in the identification of the web content as being contextually relevant. For example, if location information is defined as being more contextually relevant than calendar information, then web content that is identified as contextually relevant based on location information may be given a higher initial relevance score than web content that is identified as contextually relevant based on calendar data.

At block 1004, a loop through the filtered web content is started by selecting a particular web content.

At block 1006, relative relevance module 632 determines whether the particular web content is contextually relevant based on multiple types of context information. For example, a particular web content may be contextually relevant based on both location information and social graph information.

If the particular web content is not contextually relevant based on multiple types of context information (the "No" branch from block 1006), then processing continues at block 1010, as described below.

If the particular web content is contextually relevant based on multiple types of context information (the "Yes" branch from block 1006), then at block 1008, the relevance score associated with the particular web content is increased. In an example implementation, the relevance score may be increased a set amount, regardless of the number of different types of contextual information that apply to the particular web content. In an alternate implementation, the amount by which the relevance score is increased may vary depending on how many different types of context information apply to the particular web content such that, the relevance score is increased more if more different types of context information apply.

At block 1010, relative relevance module 632 determines whether the particular web content is contextually relevant based on recent direct communication. In an example implementation, recent direct communication may include, for example, phone calls, emails, instant messages, or messages exchanged through a social network.

If the particular web content is not contextually relevant based on recent direct communication (the "No" branch from block 1010), then processing continues as described above at block 1004, with another filtered web content being selected.

If the particular web content is contextually relevant based on recent direct communication (the "Yes" branch from block 1010), then at block 1012, the relevance score associated with the particular web content is increased.

CONCLUSION

With the ever-increasing functionality and data access available through mobile devices, such devices can be valuable sources of contextual information associated with a user. By leveraging the contextual information available on a mobile device, an infotainment access tool can effectively filter large amounts of available web content to provide web content that is likely to be of interest to the user.

Although providing access to web content based on mobile contextual data has been described in language specific to structural features and/or methodological operations, it is to be understood that the features and operations defined in the appended claims is not necessarily limited to the specific features or operations described. Rather, the specific features and operations are disclosed as example forms of implementing the claims.

What is claimed is:

1. A method comprising:
   under control of one or more processors configured with executable instructions:
   in response to receiving a request to launch a browser application, launching an infotainment access tool instead of the browser application, the infotainment access tool being distinct from the browser application;
   identifying available web content that includes a plurality of available web stories;
   determining a context associated with a user, the context comprising a plurality of types of contextual information;
   filtering the available web content based, at least in part, on the context to generate filtered web content;
   determining relative relevance of individual web stories in the filtered web content;
   determining presentation features based at least in part on the relative relevance;
   enabling the user to change the relative relevance of the individual web stories by modifying one or more of the presentation features that are based on the relative relevance;
   rendering, through a user interface, representations of the individual web stories included in the filtered web content; and
   increasing reliance on context information related to an individual web story of the individual web stories when filtering future web content in response to receiving a selection of the individual web story.

2. A method as recited in claim 1, wherein the context associated with the user is based at least in part on at least one of location information or social network interactions.

3. A method as recited in claim 1, wherein the context associated with the user is based on calendar information.

4. A method as recited in claim 1, wherein the plurality of types of contextual information comprise any combination of two or more of:
   user-specified favorite web pages;
   user-specified keywords;
   user-subscribed Really Simple Syndication (RSS) feeds;
   a current location associated with the user;
   a previous location associated with the user;

a location of an appointment scheduled in a calendar;
a date or time of an appointment scheduled in a calendar;
email information;
information shared through social networking;
transaction data;
recent searches;
recent instant message information; or
recent phone calls.

5. A method as recited in claim 1, wherein the presentation features comprise at least one of:
a size of a particular representation; or
a display location of the particular representation.

6. A method as recited in claim 1, further comprising:
receiving a user-submitted selection of a particular web story through the user interface; and
in response to the user-submitted selection through the user interface, launching a browser application and loading a web page that is associated with the particular web story.

7. A method as recited in claim 1, further comprising:
receiving user feedback regarding one or more of the individual web stories; and
modifying one or more filter attributes based on the user feedback.

8. A method as recited in claim 7, wherein the user feedback is implicit or explicit.

9. A method as recited in claim 1, wherein modifying the one or more of the presentation features comprises stretching a representation associated with a particular web story of the individual web stories to indicate increase a relevance of the particular web story.

10. A mobile computing device comprising:
a processor;
memory communicatively coupled to the processor;
an infotainment access tool, at least partially stored in the memory and executable by the processor, the infotainment access tool including:
a web content interface to identify available web content;
a context interface to identify current context information;
a contextual filter to filter the available web content based at least in part on the current context information, and generate filtered web content;
a user interface module to render a user interface that includes representations of individual web stories of the filtered web content; and
a learning module to increase reliance on context information related to an individual web story of the filtered web content when filtering future web content in response to receiving a selection of the individual web story of the filtered web content.

11. A mobile computing device as recited in claim 10, wherein the current context information is derived from one or more information sources on the mobile computing device.

12. A mobile computing device as recited in claim 11, wherein the one or more information sources on the mobile computing device include at least one of a global positioning system module, a calendar application or an email application.

13. A mobile computing device as recited in claim 10, the infotainment access tool further including:
a relative relevance module to associate a particular web story of the filtered web content with an indication of the particular web story's contextual relevance, relative to contextual relevance of other web stories of the filtered web content;
wherein the user interface module renders the user interface to include the representations of the individual web stories of the filtered web content such that a presentation characteristic of a particular representation is based, at least in part, on the contextual relevance of the particular web story, relative to the contextual relevance of the other web stories.

14. A mobile computing device as recited in claim 10, the learning module further configured to:
generate user selection data by monitoring a user selection of the representations of the individual web stories through the user interface; and
use the user selection data to modify a functionality of the contextual filter.

15. A mobile computing device as recited in claim 10, further comprising a browser application to provide access to a particular web story that is part of the filtered web content, the browser application being launched in response to a user selection of a representation of the particular web story through the user interface module of the infotainment access tool.

16. A mobile computing device as recited in claim 10, wherein the learning module is further configured to decrease reliance of the current context information when filtering the future web content when none of the individual web stories of the filtered web content is selected.

17. One or more computer storage media encoded with instructions that, when executed, direct a computing device to perform operations comprising:
in response to receiving a request to launch a browser application, launching an infotainment access tool instead of the browser application, the infotainment access tool being distinct from the browser application;
filtering available web content to generate filtered web content based at least in part on current context information associated with the computing device;
identifying contextually relevant web content from the filtered web content, the contextually relevant web content including a plurality of web stories;
presenting representations of the plurality of web stories through a user interface of the infotainment access tool;
receiving, through the user interface of the infotainment access tool, a user-submitted selection of a representation of a particular web story of the plurality of web stories; and
in response to receiving the user-submitted selection, launching the browser application and loading a web page associated with the particular web story into a user interface associated with the browser application.

18. One or more computer storage media as recited in claim 17, wherein the representations of the plurality of web stories comprise respective snapshots of the plurality of web stories.

19. One or more computer storage media as recited in claim 17, the operations further comprising:
tracking user feedback regarding the contextually relevant web content;
decreasing a reliance on a first type of context information for determining contextual relevancy when filtering future web content if web content that is identified as being contextually relevant based on the first type of context information is less frequently selected by a user; and
increasing a reliance on a second type of context information for determining the contextual relevancy when filtering the future web content if web content that is identified as being contextually relevant based on the second type of context information is more frequently selected by the user.

20. One or more computer storage media as recited in claim 19, wherein the first type of context information or the second type of context information comprises location information, social graph information, calendar information, email information, user-defined favorite information, transaction information or historical usage information.

* * * * *